(12) United States Patent
Hosokawa et al.

(10) Patent No.: US 6,709,788 B2
(45) Date of Patent: Mar. 23, 2004

(54) LITHIUM SECONDARY CELL AND METHOD OF PRODUCING LITHIUM NICKEL METAL OXIDE POSITIVE ELECTRODE THEREFOR

(75) Inventors: Norikazu Hosokawa, Nagoya (JP); Hiroshi Ueshima, Anjo (JP); Kenichiro Kami, Takahama (JP); Manabu Yamada, Okazaki (JP)

(73) Assignee: Denso Corporation, Kariya (JP)

( * ) Notice: Subject to any disclaimer, the term of this patent is extended or adjusted under 35 U.S.C. 154(b) by 83 days.

(21) Appl. No.: 09/932,980

(22) Filed: Aug. 21, 2001

(65) Prior Publication Data

US 2003/0027046 A1 Feb. 6, 2003

(30) Foreign Application Priority Data

May 11, 2001 (JP) .......................... 2001-141590

(51) Int. Cl.⁷ .............................................. H01M 6/14
(52) U.S. Cl. ....................................................... 429/223
(58) Field of Search .......................................... 429/223

(56) References Cited

U.S. PATENT DOCUMENTS 5,618,640 A * 4/1997 Idota et al. ................. 429/194
5,869,208 A * 2/1999 Miyasaka ................... 429/224

FOREIGN PATENT DOCUMENTS

| JP | 2-158055 | 6/1990 |
|---|---|---|
| JP | 4-267054 | 9/1992 |
| JP | 8-106897 | 4/1996 |
| JP | 10-12243 | 1/1998 |

* cited by examiner

Primary Examiner—Mark Ruthkosky
(74) Attorney, Agent, or Firm—Harness, Dickey & Pierce, PLC

(57) ABSTRACT

A lithium secondary cell, in which a water-soluble polymer having a superior resistance to organic solvents is used as a binder, is disclosed. The cell comprises a positive electrode and an electrolytic solution, wherein the positive electrode includes a positive electrode active material having a $LiNiO_2$ compound expressed as $Li_xNi_{1-y}M_yO_2$ (M is at least one element selected from a group including Co, Mn, Al, B, Ti, Mg and Fe, $0<x\leq1.2$, $0<y\leq0.25$) with a specific crystallimity and a binder for binding the positive electrode active material. The BET specific surface area of the $LiNiO_2$ compound is not more than $0.65\ m^2/g$. The binder has a water-soluble polymer not swollen with the electrolytic solution. The surface of the positive electrode active material is covered by the water-soluble polymer.

12 Claims, 1 Drawing Sheet

LITHIUM SECONDARY CELL AND METHOD OF PRODUCING LITHIUM NICKEL METAL OXIDE POSITIVE ELECTRODE THEREFOR

BACKGROUND OF THE INVENTION

1. Field of the Invention

The present invention relates to a lithium secondary cell and, in particular, to a lithium secondary cell having a positive electrode containing an active material and a binder.

2. Description of the Related Art

In recent years, lithium cells, which have a high weight energy density, have been widely used as power supplies for electronic appliances such as portable telephones and portable video cameras. A lithium cell includes a positive electrode containing a positive electrode active material containing lithium and capable of deintercalating lithium as lithium ions at the time of charging and capable of intercalating lithium ions at the time of discharging, a negative electrode having a negative electrode active material and capable of intercalating lithium ions at the time of charging and capable of deintercalating lithium ions at the time of discharging, and a non-aqueous electrolytic solution, including an organic solvent, containing a dissolved electrolyte composed of a supporting salt containing lithium.

Lithium cells, in order to improve the weight to energy ratio, have positive and negative electrodes formed in the shape of sheets, which are wound or stacked through a sheet-like separator and contained in a case. The sheet-like positive and negative electrodes have a structure where a composite material layer containing an active material is formed on the surface of a metal foil making up a collector.

A positive electrode active material for use with the lithium cell generally includes a transition metal oxide or a chalcogen oxide such as $Li_xCoO_2$, $Li_xNiO_2$, $Li_xMn_2O_4$, $Li_xFeO_2$, $V_2O_5$, $Cr_2O_5$, $MnO_2$, $TiS_2$ or $MoS_2$.

For lithium cells, $LixCoO_2$, $Li_xNiO_2$ and $Li_xMn_2O_4$ are known to be especially promising as positive electrode active materials for non-aqueous electrolyte lithium cells of the 4V class. Among these Li compounds, $Li_xNiO_2$ has the largest theoretical capacity and is expected to become a positive electrode active material, for the cells, that can be supplied steadily and at low cost. Further, $LixNiO_2$ can be a compound expressed as $Li_xNi_{1-y}M_yO_2$ with an element M added thereto.

For converting an electrode having these positive electrode active materials into a sheet electrode, the method disclosed in Japanese Unexamined Patent Publication No. 2-158055 is known. In this method a powdered active material, a conduction agent, a water solution of calboxylmethylcellulose and an aqueous dispersion of polytetrafluoroethylene are uniformly mixed and prepared as a paste. The paste is applied to a film-like conductive foil, such as a rolled aluminum foil, dried and rolled.

In the process, a resin such as polytetrafluoroethylene or carboxymethylcellulose, having a superior resistance to organic solvents is, used as a binder. These resins are not swollen or dissolved by an organic solvent such as ethylene carbonate (EC), propylene carbonate (PC) or diethyl carbonate (DEC) widely used as a solvent in the electrolytic solution for the lithium cell. Also, the active material, even if it is expanded or contracted during use in the lithium cell, can be maintained in a strongly bound state. If the binder is swollen or dissolved by an organic solvent, the binding force thereof would be reduced and the charge-discharge cycle characteristic thereof would be considerably deteriorated. The use of binders having a superior resistance to organic solvents can realize a superior charge-discharge cycle characteristic of the cell. This feature is exhibited more conspicuously when the cell is at a high operating temperature.

From the viewpoint of electrode production, the use of water-dispersive or water-soluble resins as binders eliminates the need of an organic solvent and thus can suppress the cost increase which otherwise could not be avoided if an organic solvent was used. Specifically, the elimination of the use of an organic solvent reduces the solvent cost which otherwise might be required for the organic solvent itself and eliminates the need of the solvent recovery processing equipment for electrode production, thereby effectively contributing to the reduction of the industrial waste such as the waste liquid of the organic solvent.

Although $Li_xNiO_2$ or the like positive electrode active material can increase the capacity of the lithium cell, the use of a water-dispersive or water-soluble resin having a superior resistance to organic solvents as a binder, however, poses the problem of a reduced large current discharge characteristic of the lithium cell due to a reduced cell capacity and an increased charge transfer resistance. The cell performance is deteriorated by reason of the fact that $Li_xNiO_2$ or the like positive electrode active material has a high reactivity with water, and therefore an exchange reaction occurs between protons and lithium ions on the surface of the positive electrode active material or a film is formed on the surface of the active material due to the reaction with water during the process of preparing the water-soluble active material paste for producing an electrode.

To solve this problem by eliminating the effect of water, a vain attempt has been made to prepare a paste with polytetrafluoroethylene dispersed in a non-aqueous organic solvent to produce an electrode. The failure of this attempt is due to the problem that polytetrafluoroethylene is not well dispersed in a non-aqueous organic solvent, polytetrafluoroethylene particles are entangled with each other to form a gel during the preparation of the paste and an aggregate is generated after electrode production often causing shorts when the cell is assembled.

With the intention of improving the dispersion of polytetrafluoroethylene in a non-aqueous organic solvent, a method has been proposed to add a compound soluble in a non-aqueous organic solvent. Japanese Unexamined Patent Publication No. 8-106897, for example, discloses a method of adding a polyvinylidene fluoride (PVDF) or plyvinylidene chloride soluble in a non-aqueous organic solvent, and Japanese Unexamined Patent Publication No. 10-12243 discloses a method of adding polyvinylbutyral for the same purpose.

These compounds, however, have a resistance to electrolytic solutions inferior to polytetrafluoroethylene, and therefore are swollen or dissolved by an electrolytic solution. At the same time, the binding force is reduced by the expansion and contraction of the electrode active material due to charge and discharge, resulting in a considerable cycle deterioration.

Also, in the case where a resin easily swollen or dissolved by an electrolytic solution is used as a binder, the rate of coverage of the positive electrode active material by the binder is reduced, so that the contact area between the electrolytic solution and the positive electrode active material is increased during charge and discharge. Thus, the reactivity between the electrolytic solution and the positive electrode active material increases. Once the electrolytic solution reacts with the positive electrode active material, an insulative film of lithium fluoride is formed on the surface of the positive electrode active material by the decomposing reaction of the electrolytic solution. The insulative film thus formed poses the problem of an increased internal resistance of the cell.

SUMMARY OF THE INVENTION

The present invention has been developed in view of the aforementioned situation and the object thereof is to provide a lithium secondary cell which uses a water-soluble polymer having a superior resistance to organic solvents as a binder, has a high capacity, and a superior charge-discharge cycle, while suppressing an increase in the internal resistance.

It has been discovered, as a result of extensive research into positive electrode active materials and binders, that the problem described above can be solved in such a way that the area involved in the reaction with water is reduced by limiting the specific surface area of the positive electrode active material, and a film of a water-soluble polymer having a high resistance to electrolytic solutions is formed uniformly on the surface of the positive electrode active material thereby to suppress an increase in the internal resistance accompanying the charge-discharge cycle.

Specifically, according to this invention, there is provided a lithium secondary cell comprising a positive electrode including a positive electrode active material having a LiNiO$_2$ compound expressed as Li$_x$Ni$_{1-y}$M$_y$O$_2$ (M is at least one element selected from a group including Co, Mn, Al, B, Ti, Mg and Fe, 0<x≦1.2, 0<y≦0.25) and a binder for binding the positive electrode active material, and an electrolytic solution, wherein the BET specific surface area of the LiNiO$_2$ compound is not more than 0.65 m$^2$/g, the binder is a water-soluble polymer not swollen with the electrolytic solution, and the surface of the positive electrode active material is covered by the water-soluble polymer.

In the lithium secondary cell according to the invention, the specific surface area of the LiNiO$_2$ compound of the positive electrode active material is reduced thereby to reduce the area involved in the reaction, thus suppressing a decrease in the cell capacity due to the reaction with water during cell production. Also, the binder is formed of a water-soluble polymer having a superior resistance to organic solvents. Since this water-soluble polymer uniformly covers the surface of the positive electrode active material, the increase of the internal resistance and the decrease of the discharge capacity are suppressed, thereby producing a cell having a superior charge-discharge cycle characteristic.

Figure 1:
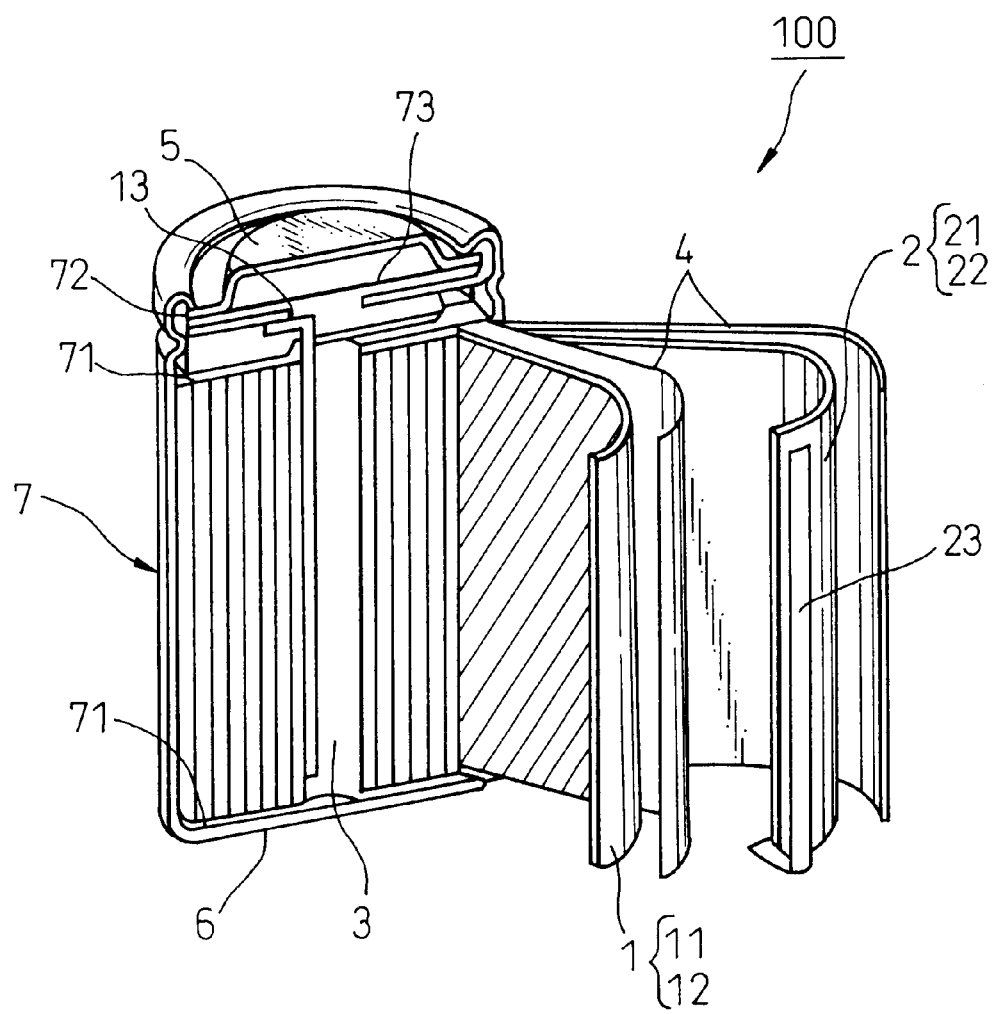
FIG. 1 is a schematic diagram showing a configuration of a cylindrical lithium secondary cell fabricated according to an embodiment of the invention.

DESCRIPTION OF THE PREFERRED EMBODIMENTS (Lithium Secondary Cell)

According to this invention, there is provided a lithium secondary cell comprising a positive electrode including a positive electrode active material and a binder, and an electrolytic solution.

The positive electrode active material has a LiNiO$_2$ compound expressed as Li$_x$Ni$_{1-y}$M$_y$O$_2$ (M is at least one element selected from an element group including Co, Mn, Al, B, Ti, Mg and Fe, 0<x≦1.2, 0<y≦0.25), where y is the sum of a plurality of elements which may constitute M.

The LiNiO$_2$ compound has a BET specific surface area of not more than 0.65 m$^2$/g. The fact that the BET specific surface area of the LiNiO$_2$ compound is not more than 0.65 m$^2$/g can suppress the exchange reaction between protons and lithium ions which otherwise might be caused by the water content of the dispersion medium in the surface of the active material. In the case where the BET specific surface area exceeds 0.65 m$^2$/g, the discharge capacity of the lithium secondary cell is reduced.

Cells comprising a positive electrode including a positive electrode active material composed of a LiNiO$_2$ compound having different specific surface areas and a binder containing polytetrafluoroethylene were prepared, and the initial cell capacity was measured. The specific surface area of the positive electrode active material was adjusted by changing the mixing ratio of the raw materials at the time of synthesizing the active material, the baking temperature and the environment (oxygen concentration, dewing point, CO$_2$ content, etc.). A positive electrode was prepared by use of active material samples with different specific surface areas and an aqueous binder containing an aqueous dispersion of polytetrafluoroethylene and water-soluble cellulose resin, and a cell having this positive electrode was produced. The initial discharge capacity of this cell was measured. Also, for reference, a cell comprising an organic solvent binder including PVDF and N-methyl-2-pyrrolidone (NMP) was prepared, and the discharge capacity thereof was measured. The initial discharge capacity was measured by a method similar to the one used for evaluation of the embodiments. The measurement is shown in Table 1.

TABLE 1

| BET specific surface area (m$^2$/g) | Initial discharge capacity for each positive electrode active material | |
|---|---|---|
| | Aqueous binder (mAh/g) | Binder of organic solvent (mAh/g) |
| 0.55 | 160 | 158 |
| 0.65 | 158 | 158 |
| 0.83 | 148 | 161 |
| 1.04 | 134 | 160 |

Table 1 shows that the cell containing an aqueous binder has such a characteristic that the initial discharge capacity decreases with the increase in the specific surface area of the positive electrode activation material. This is considered due to the fact that an increased specific surface area of the positive electrode activation material causes a reaction with water contained in the aqueous binder. Also, with the cell containing a positive electrode active material having a specific surface area of 0.65 m$^2$/g, an initial cell capacity substantially equivalent to using a binder of organic solvent is realized by use of an aqueous binder.

The binder binds the positive electrode active material. The binder contains a water-soluble polymer not swollen with the electrolytic solution and uniformly covers the surface of the positive electrode activation material. This binder has a superior resistance to an organic solvent, and therefore is not swollen or dissolved with the electrolytic solution of the lithium cell. Also, the positive electrode active material expanding or contracting at the time of cell charge or discharge can be kept strongly bound. Thus, a superior cycle characteristic can be realized in a cell. Also, the viscosity of the binder permits it to function as a viscosity improver.

The binder contains a water-soluble polymer not swollen with the electrolytic solution and therefore can uniformly cover the surface of the positive electrode active material, thereby suppressing the reaction between the positive electrode active material and the electrolytic solution in the lithium secondary cell.

Specifically, at the time of preparing an electrode paste during the production of the lithium secondary cell, the water-soluble polymer of the binder is uniformly dissolved in water. Therefore, an electrode paste with the water-soluble polymer uniformly dissolved can be prepared and the water-soluble polymer uniformly covers the surface of the positive electrode active material.

A water-soluble polymer not swollen with an electrolytic solution is used in view of the fact that the film of the water-soluble polymer is formed on the surface of the positive electrode active material and is kept in contact with the electrolytic solution. The water-soluble polymer is not dissolved in the electrolytic solution, thereby making it possible to maintain the coverage of the water-soluble polymer formed on the surface of the positive electrode active material.

The water-soluble polymer includes a cellulose such as methyl cellulose (MC), carboxymethyl cellulose (CMC), ethyl cellulose (EC), hydroxyethyl cellulose (HEC), hydroxypropyl methyl cellulose (HPMC) or hydroxyethyl methyl cellulose (HEMC) or polyacrylate.

More preferably, the water-soluble polymer is water-soluble cellulose.

The binder preferably has a resin contributing to the flexibility of the positive electrode. Specifically, the fact that the resin contained in the binder contributes to the flexibility of the positive electrode gives flexibility to the positive electrode and facilitates the handling of the positive electrode during the production process. More specifically, although the positive electrode active material, the conduction agent and the collector can be bound using only the water-soluble polymer as a binder, the resultant lack of flexibility of the positive electrode is liable to damage the positive electrode by separation or cracking of the active material layer when it is handled, or wound, in sheet form.

The resin contributing to the flexibility of the positive electrode preferably has a superior resistance to the electrolytic solution. Specifically, since the resin contributing to the flexibility of the positive electrode is used as a binder, swelling or dissolution in the electrolytic solution would cause the water-soluble polymer to damage the film formed on the surface of the positive electrode active material.

The resins contributing to the flexibility of the positive electrode include fluoric resins such as polytetrafluoroethylene (PTFE), tetrafluoroethylene-hexafluoropropyrene copolymer (FEP), tetrafluoroethylene-perfluoroalkyl vinyl ether copolymer (PFA), tetrafluoroethylene-ethylene copolymer (ETFE), tetrafluoroethylene-hexafluoropropyrene-perfluoroalkyl vinyl ether copolymer (EPE), acrylic resin, polyethylene, polyolefin group such as polyolefin or a resin such as polyimide resin.

The resin contributing to the flexibility of the positive electrode is preferably a fluoric resin. Specifically, a fluoric resin is not swollen by or dissolved in the electrolytic solution, and therefore the characteristic of the cell including the binder can be improved. The lithium secondary cell according to this invention preferably comprises fluoric resin as a binder but may also comprise a resin or a polymer material other than fluoric resin as a binder.

The fluoric resin is more preferably polytetrafluoroethylene.

In the $LiNiO_2$ compound, the peak intensity ratio $(I_{006}+I_{102})/I_{101}$ of the (006) plane, (102) plane and (101) plane in the measurement of X-ray powder analysis is preferably not more than 0.421. Specifically, by increasing the crystallinity and strengthening the crystalline structure of the $LiNiO_2$ compound, the deterioration of the cycle characteristic of the lithium secondary cell can be suppressed. This is due to the reason described below.

Specifically, the ideal structure of $LiNiO_2$ is a stratified rock salt structure ($\alpha$-$NaFeO_2$ structure) with a $Li^+$ layer and a $Ni^{3+}$ layer existing between the oxygen layers. Nevertheless, $Ni^{3+}$ is liable to be reduced to $Ni^{2+}$ and the ion radius of $Ni^{2+}$(0.83 Å) is substantially equal to the ion radius of $Li^+$(0.90 Å). Therefore, $Ni^{2+}$ is liable to mix with the $Li^+$ defect site generated at the time of $LiNiO_2$ synthesis, often leading to the structure of $[Li^+_{1-x}Ni^{2+}_x]_{3b}[Ni^{3+}]_{3a}[O^{2-}_2]_{6c}$. When $Ni^{2+}$ mixes with a $Li^+_{3b}$ site, an electrochemically inactive structure is locally formed while at the same time preventing the diffusion of $Li^+$. In the case where $LiNiO_2$, having a low crystallinity, is used as an electrode active material, therefore, the problem is posed that the cell capacity and the durability are reduced.

In view of this, a method for quantitatively expressing the crystallinity of $LiNiO_2$ is employed in which the sum of the diffraction intensity $I_{006}$ attributable to the (006) plane and the diffraction intensity $I_{102}$ attributable to the (102) plane in the crystalline structure analysis using the X-ray diffraction is divided by the diffraction intensity $I_{101}$ attributable to the (101) plane, and the resulting value $(I_{006}+I_{102})/I_{101}$ is used. The smaller this value, the smaller the crystal defects for a higher binding force.

The relation between the peak intensity ratio $(I006+I_{102})/I_{101}$ of the $LiNiO_2$ compound and the cell characteristic was determined by measurement. The result of measurement is shown in Table 2. More specifically, a cell composed of a positive electrode having a positive electrode active material of a constant specific surface area and a different peak intensity ratio of XRD and a binder containing polytetrafluoroethylene was prepared, and the discharge capacity after a charge-discharge test was measured. First, while maintaining the BET specific surface area by changing the mixing ratio of the raw materials, the baking temperature and the ambience (oxygen concentration, dewing point, $CO_2$ content, etc.) for synthesis, samples of a positive electrode active material composed of a $LiNi_{0.81}Co_{0.15}Al_{0.04}O_2$ compound having different peak intensity ratios $(I_{006}+I_{102})/I_{101}$ were prepared. Cells each including a positive electrode having this positive electrode active material and an aqueous binder composed of an aqueous dispersion of polytetrafluoroethylene and a water-soluble cellulose resin were prepared, and the initial discharge capacity and the discharge capacity after a charge-discharge test were measured. In the process, the BET specific surface area of this positive electrode active material was 0.65 $m^2$/g. Also, a lithium cell was prepared using a binder of an organic solvent composed of PVDF and NMP for each positive electrode active material. Incidentally, the initial discharge capacity and the cycle characteristic were measured by the method described later with reference to the embodiments.

TABLE 2

| BET specific surface area (m²/g) | XRD intensity ratio | Aqueous binder | | Organic solvent binder | |
|---|---|---|---|---|---|
| | | Initial capacity (mAh/g) | Capacity ratio (%) | Initial capacity (mAh/g) | Capacity ratio (%) |
| 0.55 | 0.412 | 158 | 85.1 | 158 | 76.1 |
| 0.55 | 0.421 | 158 | 82.3 | 158 | 81.5 |
| 0.50 | 0.449 | 158 | 65.2 | 160 | 80.1 |

Table 2 shows that the cell composed of an aqueous binder realizes the initial discharge capacity of 158 mAh/g equivalent to that of the cell composed of an organic solvent binder regardless of the peak intensity ratio. Also, the discharge capacity ratio after a charge-discharge test for the cell composed of an activation material having a peak intensity ratio $(I_{006}+I_{102})/I_{101}$ of not more than 0.421 is superior to that of the cell composed of an organic solvent binder.

The positive electrode active material is preferably composed of a LiMnO$_4$ compound expressed as Li$_a$Mn$_b$Me$_c$O$_4$ (Me is at least one element selected from a group including Co, Cu, Fe, Ni, Zn, Al, Cr, Ti, Mg and V, $1 \leq a \leq 1.15$, $0 \leq c \leq 0.35$, a+b+c=3). By mixing this LiMnO$_4$ compound with the positive electrode active material, the charge-discharge curve of the lithium secondary cell can be adjusted. As a result, a lithium secondary cell having a different charge-discharge characteristic can be produced and the applications of the lithium secondary cell are widened. More specifically, by mixing the LiMn$_2$O$_4$ compound, the charge-discharge curve of the positive electrode active material is displaced and, by changing the amount of the LiMn$_2$O$_4$ mixed, the amount of displacement is changed. A different charge-discharge curve changes the charge-discharge capacity from the same potential, resulting in a change of the charge-discharge characteristic of the lithium secondary cell. An LiMn$_2$O$_4$ compound of an arbitrary ratio can be mixed with the positive electrode active material.

The electrolytic solution for an ordinary lithium secondary cell can be used. This electrolytic solution is one of an organic solvent such as 1,2-dimethoxy ethane, 1,2-diethoxy ethane, propylene carbonate, ethylene carbonate, γ-butyrolactone, tetrahydrofuran, 1,3-dioxolane, diethyl carbonate, dimethyl carbonate or ethyl methyl carbonate, each as a single substance or a solvent mixture of two or more, adjusted by being dissolved with, for example, LiCF$_3$SO$_3$, LiC$_4$F$_9$SO$_3$, LiClO$_4$, LiPF$_6$, LiBF$_4$, LiN(CF$_3$SO$_2$)(CF$_3$SO$_2$), LiN(C$_4$F$_9$SO$_2$)(CF$_3$SO$_2$), LiN(C$_2$F$_5$SO$_2$)(C$_2$F$_5$SO$_2$) or the like electrolytic solution, each as a single substance or a mixture of two or more.

The lithium secondary cell according to this invention can take the form ordinarily used except for the positive electrode active material, the binder and the electrolytic solution. Also, the structure of the lithium secondary cell according to the invention is not specifically limited. For example, the positive electrode and the negative electrode can be formed in sheets stacked alternately with a separator between them to constitute a stack-type electrode cell having stack-type electrodes, or the positive electrode and the negative electrode in sheets can be wound with a separator in between to constitute a wound-type electrode cell having wound-type electrodes.

The positive electrode and the negative electrode, in sheets, are preferably formed by coating a collector with a composite material containing a mixture of an active material, a conduction material and a binder.

Examples of the negative electrode active material, the collector and the separator usable with the lithium secondary cell according to this invention are shown below.

As the negative electrode active material, for example, flaky graphite, spheroidal graphite, amorphous carbon or the like carbon material capable of intercalating and deintercalating lithium, or lithium metal, can be used.

The collector for the positive electrode is made of aluminum or stainless steel, and the collector for the negative electrode is composed of copper or nickel in the form of a net, a punched metal, a formed metal or a tabular metal foil.

The separator usable in the invention includes a microporous polypropylene film or a microporous polyethylene film having a thickness of 10 to 50 μm and a hole area rate of 30 to 70%.

In the lithium secondary cell according to this invention, the area involved in the reaction is reduced and thereby a reduction in the cell capacity due to a reaction with water is suppressed by reducing the specific surface area of the surface of the positive electrode active material. Also, a water-soluble polymer having a superior resistance to organic solvents is used as a binder and covers the surface of the positive electrode active material uniformly. In this way, an increase in the internal resistance is suppressed, the swelling or dissolution in the electrolytic solution is avoided, and the electrode activation material, even when expanded or contracted at the time of charge or discharge of the cell, can be kept firmly bound. As a result, a cell having a superior charge-discharge cycle is produced.

(Method of Fabricating Positive Electrode of Lithium Secondary Cell)

A method of producing the positive electrode of a lithium secondary cell according to this invention comprises a paste preparation step for preparing a paste-like activation material mixture of water, a positive electrode activation material having a LiNiO$_2$ compound expressed as Li$_x$Ni$_{1-y}$M$_y$O$_2$ (M is at least one element selected from a group including Co, Mn, Al, B, Ti, Mg and Fe, $0<x \leq 1.2$, $0<y \leq 0.25$) and having a BET specific surface area of not more than 0.65 m²/g, and a binder having a water-soluble polymer not swollen with the electrolytic solution used for the lithium secondary cell, and the coating step for coating the paste-like active material mixture on a collector.

The method of producing the positive electrode of a lithium secondary cell according to the invention comprises the paste preparation step for preparing a paste-like active material mixture of a positive electrode active material, a binder and water. This paste preparation step uses, as a binder, a water-soluble polymer not swollen with the electrolytic solution used for the lithium secondary cell, and therefore can use water as a medium. As a result, no organic solvent is used, and therefore the cost required for cell production can be reduced. Also, by mixing the positive electrode active material, the binder and water in the paste preparation step to prepare the paste-like active material mixture, a film of the binder can be formed on the surface of the positive electrode active material.

The paste preparation step is for preparing the paste-like active material mixture of the positive electrode active material, the binder and water, and may employ any other alternative method as long as the particular mixture can be prepared.

The positive electrode activation material contains a compound expressed as Li$_x$Ni$_{1-y}$M$_y$O$_2$ (M is at least one element selected from a group including Co, Mn, Al, B, Ti, Mg and Fe, $0<x \leq 1.2$, $0<y \leq 0.25$).

The LiNiO$_2$ compound has the BET specific surface area of not more than 0.65 m²/g. By securing a BET specific surface area, of the LiNiO$_2$ compound, of not more than 0.65 m$^2$/g, the exchange reaction between protons and lithium ions due to water in the surface of the LiNiO$_2$ compound is suppressed. In the case where the BET specific surface area exceeds 0.65 m$^2$/g, on the other hand, a reaction occurs with water and the initial discharge capacity is decreased.

The binder contains a water-soluble polymer not swollen with the electrolytic solution used for the lithium secondary cell. The fact that the binder contains a water-soluble polymer not swollen with the electrolytic solution makes it possible to uniformly cover the surface of the positive electrode active material with the water-soluble polymer in the paste preparation step. In this way, it is possible to suppress the reaction between the positive electrode active material and the electrolytic solution of the lithium secondary cell comprising the positive electrode thus produced.

Specifically, the binder having a water-soluble polymer is uniformly dissolved in water in the paste preparation step, so that the positive electrode active material is dispersed in this solution. Therefore, the positive electrode active material uniformly covered with a water-soluble polymer can be produced.

The film of a water-soluble polymer formed on the surface of the positive electrode active material is kept in contact with the electrolytic solution when the cell is formed. Therefore, a water-soluble polymer not swollen with the electrolytic solution is used. Also, the water-soluble polymer is not dissolved in the electrolytic solution. In this way, the film formed on the surface of the positive electrode active material is held by the water-soluble polymer.

This binder has a high resistance to organic solvents, and therefore is not swollen or dissolved by the electrolytic solution of the lithium cell. Also, the activation material, even when expanded or contracted by the charge or discharge, is maintained in a firmly bound state. Thus, the lithium cell can exhibit a superior cycle characteristic. Further, the viscosity of the binder permits it to function as a viscosity improver.

The water-soluble polymer of this type includes a cellulose such as methyl cellulose (MC), carboxy methyl cellulose (CMC), ethyl cellulose (EC), hydroxy ethyl cellulose (HEC), hydroxy propyl methyl cellulose (HPMC) or hydroxy ethyl methyl cellulose (HEMC) or polyacrylate.

More preferably, the water-soluble polymer is a water-soluble cellulose.

The binder preferably contains a resin contributing to the flexibility of the positive electrode. Specifically, the fact that the binder contains a resin contributing to the flexibility of the positive electrode makes it possible for the positive electrode to have a flexibility and facilitates the handling of the positive electrode in the production process. More specifically, although only the water-soluble polymer can be used as a binder to bind the positive electrode active material, the conduction agent and the collector, the lack of flexibility of the positive electrode thus produced is liable to cause damage to the positive electrode such as cracking or separation of the active material layer at the time of handling or winding the positive electrode in sheet form.

Also, the resin contributing to the flexibility of the positive electrode preferably has a high resistance to the electrolytic solution. Specifically, the resin contributing to the flexibility of the positive electrode is used as a binder and, therefore, once it is swollen or dissolved with the electrolytic solution, the water-soluble polymer damages the film formed on the surface of the positive electrode active material.

The resin contributing to the flexibility of the positive electrode includes fluoric resin such as polytetrafluoroethylene (PTFE), tetrafluoroethylene-hexafluoropropylene copolymer (FEP), tetrafluoroethylene-perfluoroalkylvinyl ether copolymer (PFA), tetrafluoroethylene-ethylene copolymer (ETFE), tetrafluoroethylene-hexafluoropropylene-perfluoroalkyl vinyl ether copolymer (EPE), acrylic resin, polyethylene, an olefin group such as polyolefin or resins such as polyimide resin.

The resin contributing to the flexibility of the positive electrode is preferably a fluoric resin. Specifically, the fluoric resin is not swollen or dissolved with the electrolytic solution, and therefore, the characteristic of the cell using it as a binder can be improved. According to this invention, although the fluoric resin is preferably used as a binder, the use of resins or polymer materials other than fluoric resin is not inhibited.

More preferably, the fluoric resin is polytetrafluoroethylene.

An electrolytic solution for an ordinary lithium secondary cell can be used for the lithium secondary cell, wherein a binder is not swollen with the electrolytic solution. This electrolytic solution is composed of an organic solvent including, for example, 1,2-dimethoxy ethane, 1,2-diethoxy ethane, propylene carbonate, ethylene carbonate, γ-butyrolactone, tetrahydrafuran, 1,3-dioxyolane, diethylane carbonate, dimethyl carbonate or ethyl methyl carbonate, each as a single substance or a mixture of two or more, adjusted by being dissolved with, for example, LiCF$_3$SO$_3$, LiC$_4$F$_9$SO$_3$, LiClO$_4$, LiPF$_6$, LiBF$_4$, LiN(CF$_3$SO$_2$)(CF$_3$SO$_2$), LiN(C$_4$F$_9$SO$_2$)(CF$_3$SO$_2$), LiN(C$_2$F$_5$SO$_2$)(C$_2$F$_5$SO$_2$) or the like electrolytic solution, each as a single substance or a mixture of two or more.

The positive electrode active material preferably contains a LiMn$_2$O$_4$ compound expressed as Li$_a$Mn$_b$Me$_c$O$_4$ (Me is at least one element selected from the group including Co, Cu, Fe, Ni, Zn, Al, Cr, Ti, Mg and V, $1 \leq a \leq 1.15$, $0 \leq c \leq 0.35$, a+b+c=3). The fact that the positive electrode active material contains a LiMn$_2$O$_4$ compound can change the characteristic of the lithium secondary cell.

The coating process is for coating a paste-like active material mixture on a collector. The paste-like activation material mixture can be coated on the collector by an ordinary method of coating the paste-like active material mixture. Such a coating method uses, for example, a die coater, a comma coater, a reverse roller or a doctor blade.

The coating process preferably includes a drying step for drying the paste-like active material mixture coated on the collector. By drying the paste-like active material mixture coated on the collector, the paste-like active material mixture is prevented from flowing on the surface of the collector and changing in thickness in subsequent steps.

The method of fabricating the positive electrode of a lithium secondary cell according to the invention preferably includes a pressing step for pressing the collector coated with the paste-like active material mixture. Specifically, by pressing the paste-like active material mixture coated on the surface of the collector, the paste-like activation material mixture can be attached tightly on the collector while at the same time improving the weight energy density of the positive electrode. In this pressing step, preferably, the paste-like active material mixture is pressed after being dried.

The positive electrode fabricated by the method of fabricating the positive electrode of the lithium secondary cell according to this invention can be used for an ordinary lithium secondary cell. Specifically, the negative electrode, the separator, etc. other than the positive electrode of the conventional lithium secondary cell can be used for the lithium secondary cell having the positive electrode fabricated according to the fabrication method of the invention. Also, a fabrication method similar to the conventional method of fabricating a lithium secondary cell can be used for fabricating the lithium secondary cell according to this invention.

In the method of fabricating a lithium secondary cell according to the invention, the use of a positive electrode active material with a reduced specific surface area reduces the area involved in the reaction and suppresses the reduction of the cell capacity due to a reaction with water. Also, a water-soluble polymer having a high resistance to organic solvents is used as a binder and covers the surface of the positive electrode active material uniformly. Therefore, the increase of the internal resistance is suppressed, and the binder is not swollen or dissolved by the electrolytic solution. At the same time, the active material can be kept firmly bound even against the expansion or contraction of the electrode active material at the time of charge or discharge of the cell. As a result, the lithium secondary cell comprising the positive electrode fabricated by the fabrication method according to the invention provides a cell having a superior charge-discharge cycle.

Further, the use of a water-soluble polymer high in the resistance to organic solvents as a binder of the positive electrode permits the positive electrode to be fabricated without organic solvents. As a result, the expense which has thus far been required for the use of an organic solvent and the cost of the materials of the organic solvent can be reduced and therefore the positive electrode can be fabricated both safely and inexpensively.

The present invention will be explained below with reference to embodiments.

A lithium secondary cell according to an embodiment of the invention was prepared.

The BET specific surface area and the XRD of the positive electrode active material used in this embodiment were measured by the following methods.

(BET Specific Surface Area)

The BET specific surface area (hereinafter referred to as the nitrogen BET specific surface area) was measured by the nitrogen adsorption method using FLOWSOAP Model II2300 of Shimazu Seisakusho Ltd.

The diffraction intensity was measured using Model RINT 2000 of Rigaku Ltd., with an X-ray source CuK$\alpha_1$, a tube voltage of 50 kV, a tube current of 100 mA, a divergence slit of ½ degree, a scattering slit of ½ degree, a light receiving slit of 0.15 mm, a "continuous" scan mode and a scan range of 15° to 75°.

The background was removed from the resultant data with the radius of curvature of 5.0 using the RISM qualitative analysis program, after which the intensity ratio K$\alpha_1$/K$\alpha_2$ was set to 0.5 and the effect of K$\alpha_2$ was removed.

From the data thus obtained, the X-ray diffraction intensity corresponding to each exponential plane was read, and the peak intensity ratio $(I_{006}+I_{102})/I_{101}$ was determined for the (006) plane, the (102) plane and the (101) plane providing a measure of crystallinity in the positive electrode active material $LiNiO_2$.

(Embodiment 1)

The first embodiment concerns a cylindrical lithium secondary cell 100 shown in FIG. 1.

The cylindrical lithium secondary cell 100 comprises a positive electrode 1 with a positive electrode active material containing lithium, capable of deintercalating lithium as lithium ions at the time of charging and capable of intercalating the lithium ions at the time of discharging, a negative electrode 2 having a negative electrode active material composed of a carbon material and capable of intercalating lithium ions at the time of charging and capable of deintercalating lithium ions at the time of discharging, and a non-aqueous electrolytic solution 3 including an organic solvent with a supporting salt containing lithium dissolved therein.

The positive electrode 1 includes a positive electrode collector 11, a positive electrode composite material layer 12 having a positive electrode active material and a binder formed on the surface of the positive electrode collector 11, and a positive electrode collection lead 13 coupled to the positive electrode collector 11.

The positive electrode active material is $LiNi_{0.81}Co_{0.15}Al_{0.04}O_2$, a lithium-nickel oxide having the nitrogen BET specific surface area of 0.65 m$^2$/g, and the peak intensity ratio $(I_{006}+I_{102})/I_{101}$ of 0.421 due to XRD, and the binder is a mixture of the aqueous solution of the sodium salt of carboxyl methyl cellulose and PTFE.

The negative electrode 2 includes a negative electrode collector 21, a negative electrode composite agent layer 22 having a negative electrode active material formed on the surface of the negative electrode collector 21 and a negative electrode collection lead 23 coupled to the negative electrode collector 21.

The positive electrode 1 and the negative electrode 2 are wound through a separator 4 and held in a case 7. The collection leads 13, 23 of the positive electrode 1 and the negative electrode 2, respectively, are connected to the positive electrode terminal unit 5 and the negative electrode terminal unit 6 of the case, respectively.

The separator 4 is made of a polyethylene porous film having a thickness of 25 µm, and the electrolytic solution is composed of a solvent mixture of 30 volume parts of ethylene carbonate (EC) and 70 volume parts of diethylene carbonate (DEC) in which $LiPF_6$, at 1 mol/l, is dissolved as an electrolyte.

The lithium secondary cell according to the first embodiment was fabricated by the following steps:

(Fabrication of Positive Electrode)

First, a positive electrode active material of 87 wt %, a conduction agent (acetylene black HS-100) of 10 wt:, and an aqueous solution of sodium salt of carboxy methyl cellulose of 2 wt % containing a binder functioning as a viscosity improver were mixed to attain a solid component of 2 wt %, and stirred for one hour in a biaxial agitator. After that, the PTFE aqueous dispersion having a solid portion of about 50% was added as a binder to obtain 1 wt % of a PTFE solid component, and agitated for 30 minutes in a vacuum emulsion agitator. The paste obtained in this way was applied on each of the two surfaces at the rate of 8.56 mg/cm$^2$ on an aluminum foil by a comma coater.

Then, this electrode was passed through a roll press and subjected to a load of linear pressure 0.74 tons/cm into an electrode density of 2.41 g/cm$^2$. After that, the electrode was cut into a size 5.4 cm wide and 86 mm long. As a lead tab weld section for current retrieval, the electrode composite agent corresponding to the length of 2.5 cm was scraped off. The effective reaction surface of this electrode was 901.8 cm$^2$ (=5.4 cm×83.5 cm×2).

(Fabrication of Negative Electrode)

Using a flaky graphite of 92.5 wt % as a negative electrode active material and PVDF of 7.5 wt % as a binder, a paste was prepared with a solution of N-methyl-2-pyrrolidone in which PVDF was dissolved and graphite was dispersed. The paste was coated on each of the two sides at the rate of 5.1 mg/cm$^2$ on a copper foil using the comma coater as in the fabrication of the positive electrode. After that, the negative electrode active material was passed through the roll press and subjected to a load of 0.25 tons/cm in linear pressure, thereby producing an electrode with the electrode density increased to 1.25 g/cm². Then, this electrode was cut to a size 5.6 cm wide and 90.5 cm long, and the electrode composite agent corresponding to the length of 0.5 cm was scraped off as a lead tab weld zone for retrieving the current. The effective reaction area of this electrode was 1008 $cm_2$ (=5.6 cm×90 cm×2).

(Assembly of Cell)

The positive electrode and the negative electrode obtained in the above-mentioned manner were wound with a separator to thereby form wound-type electrodes, which were inserted into a case. At the same time, the collection lead was coupled to each of the positive electrode terminal and the negative electrode terminal of the case.

After that, the electrolytic solution was injected into the case and the case was closed.

By following the above-mentioned steps, the cylindrical lithium secondary cell according to the first embodiment was fabricated.

(Reference 1)

The first reference is a cylindrical lithium secondary cell similar to the first embodiment except that polyvinylidene fluoride (PVDF) was used as a binder for the positive electrode. The positive electrode with the PVDF binder was fabricated by dissolving the PVDF in N-methyl-2-pyrrolidone and dispersing the positive electrode active material and the conduction agent in the resulting solution thereby to prepare a paste, which was coated on an aluminum foil.

(Embodiment 2)

A second embodiment is a cylindrical lithium secondary cell similar to the first embodiment except that the nitrogen BET specific surface area of the positive electrode active material is 0.55 m²/g.

(Reference 2)

A second reference also concerns a cylindrical lithium secondary cell similar to the first embodiment except that the nitrogen BET specific surface area of the positive electrode activation material is 0.83 m²/g.

(Reference 3)

A third reference also concerns a cylindrical lithium secondary cell similar to the first embodiment except that the nitrogen BET specific surface area of the positive electrode activation material is 1.04 m²/g.

(Reference 4)

A fourth reference also concerns a cylindrical lithium secondary cell similar to the third reference except that PVDF is used as a binder of the positive electrode.

(Embodiment 3)

A third embodiment also concerns a cylindrical lithium secondary cell similar to the first embodiment except that the peak intensity ratio $(I_{006}+I_{102})/I_{101}$ due to XRD of the positive electrode active material is 0.412.

(Reference 5)

A fifth reference also concerns a cylindrical lithium secondary cell similar to the first embodiment except that the peak intensity ratio $(I_{006}+I_{102})/I_{101}$ due to XRD of the positive electrode active material is 0.449.

(Reference 6)

A sixth reference also concerns a cylindrical lithium secondary cell similar to the fifth reference except that PVDF is used for the binder of the positive electrode (Embodiment 4)

A fourth embodiment also concerns a cylindrical lithium secondary cell similar to the first embodiment except that the nitrogen BET specific surface area of the positive electrode active material is 0.55 m²/g and the peak intensity ratio $(I_{006}+I_{102})/I_{101}$ due to XRD is 0.412.

(Embodiment 5)

A fifth embodiment also concerns a cylindrical lithium secondary cell similar to the first embodiment except that hydroxy ethyl cellulose (HEC) is used in place of CMD as a binder of the positive electrode. In the fifth embodiment, the positive electrode is fabricated by a method similar to the first embodiment except that HEC instead of CMC is used.

(Embodiment 6)

A sixth embodiment also concerns a cylindrical lithium secondary cell similar to the first embodiment except that hydroxy propyl methyl cellulose (HPMC) is used in place of CMC as a binder of the positive electrode. In the sixth embodiment, the positive electrode is fabricated by a method similar to the first embodiment except that HPMC instead of CMC is used.

(Embodiment 7)

A seventh embodiment also concerns a cylindrical lithium secondary cell similar to the first embodiment except that hydroxy ethyl methyl cellulose (HEMC) is used in place of CMC as a binder of the positive electrode. In the seventh embodiment, the positive electrode is fabricated by a method similar to the first embodiment except that HEMC instead of CMC is used.

(Embodiment 8)

An eighth embodiment also concerns a cylindrical lithium secondary cell similar to the first embodiment except that tetrafluoroethylene-hexafluoropropylene copolymer (FEP) is used in place of PTFE as a binder of the positive electrode. In the eighth embodiment, the positive electrode is fabricated by a method similar to the first embodiment except that the FEP aqueous dispersion instead of the PTFE aqueous dispersion is used.

(Embodiment 9)

A ninth embodiment also concerns a cylindrical lithium secondary cell similar to the first embodiment except that tetrafluoroethylene-perfluoroalkyl vinyl ether copolymer (PFA) is used in place of PTFE as a binder of the positive electrode. In the ninth embodiment, the positive electrode is fabricated by a method similar to the first embodiment except that the PFA aqueous dispersion instead of the PTFE aqueous dispersion is used.

(Embodiment 10)

A tenth embodiment also concerns a cylindrical lithium secondary cell similar to the first embodiment except that acryl emulsion resin is used in place of PTFE as a binder of the positive electrode. In the tenth embodiment, the positive electrode is fabricated by a method similar to the first embodiment except that the acryl emulsion resin instead of the PTFE is used.

(Embodiment 11)

An 11th embodiment also concerns a cylindrical lithium secondary cell similar to the first embodiment except that the positive electrode active material is $LiNi_{0.80}Co_{0.15}Al_{0.05}O_2$, the nitrogen BET specific surface area is 0.65 m²/g, and the peak intensity ratio $(I_{006}+I_{102})/I_{101}$ due to XRD is 0.421.

(Embodiment 12)

A 12th embodiment also concerns a cylindrical lithium secondary cell similar to the first embodiment except that the positive electrode active material is $LiNi_{0.90}Co_{0.06}Al_{0.04}$, the nitrogen BET specific surface area is 0.65 m²/g, and the peak intensity ratio $(I_{006}+I_{102})/I_{101}$ due to XRD is 0.421.

(Embodiment 13)

A 13th embodiment also concerns a cylindrical lithium secondary cell similar to the first embodiment except that the positive electrode active material is $LiNi_{0.75}Co_{0.21}Al_{0.04}O$, the nitrogen BET specific surface area is 0.65 m²/g, and the peak intensity ratio $(I_{006}+I_{102})/I_{101}$ due to XRD is 0.421.

(Embodiment 14)

A 14th embodiment also concerns a cylindrical lithium secondary cell similar to the first embodiment except that the positive electrode active material is a mixture of $LiNi_{0.81}Co_{0.15}Al_{0.04}O_2$ and $Li_{1.12}Mn_{1.88}O_4$.

More specifically, $LiNi_{0.81}Co_{0.15}Al_{0.04}O_2$ is such that the nitrogen BET specific surface area is 0.65 m²/g and the peak intensity ratio $(I_{006}+I_{102})/I_{101}$ due to XRD is 0.421, while $Li_{1.12}Mn_{1.88}O_4$ is such that the nitrogen BET specific surface area is 0.5 m²/g. The mixing ratio of $LiNi_{0.81}Co_{0.15}Al_{0.04}O_2$ and $Li_{1.12}Mn_{1.88}O_4$ is 60 to 27 by weight.

(Embodiment 15)

A 15th embodiment also concerns a cylindrical lithium secondary cell similar to the 14th embodiment except that the mixing ratio of $LiNi_{0.81}Co_{0.15}Al_{0.04}$ $o_2$ and $Li_{1.12}Mn_{1.88}O_4$ is 27 to 60 by weight.

(Reference 7)

A seventh reference also concerns a cylindrical lithium secondary cell similar to the 14th embodiment except that PVDF is used as a binder of the positive electrode.

(Reference 8)

An eighth reference also concerns a cylindrical lithium secondary cell similar to the 15th embodiment except that PVDF is used as a binder of the positive electrode.

(Evaluation)

For evaluating the lithium secondary cells according to the embodiments and the references, the initial discharge capacity, the high-temperature cycle characteristic and the internal resistance increase rate were measured. The result of measurement is shown in Table 3. These items were measured by the methods described below. For the cells according to the third to sixth references, however, only the initial discharge capacity was measured.

(Initial Discharge Capacity)

In the first step, the CC-CV charge was conducted with a charge current of 250 mA up to 4.1 V, followed by the CC charge with a discharge current of 333 mA down to 3.0 V.

Then, the CC-CV charge was conducted with a charge current of 1000 mA up to 4.1 V, followed by the CC discharge with a discharge current of 1000 mA down to 3.0 V. This cycle was repeated four times. After that, the CC-CV charge was conducted with a charge current of 1000 mA up to 4.1 V, followed by the CC discharge with a discharge current of 333 mA down to 3.0 V.

With this discharge capacity as an initial cell capacity, comparison was made using the values standardized by the positive electrode active material filled in the cell. The measurement was dove at a temperature of 25° C.

(High Temperature Cycle Characteristic)

After measuring the initial capacity, the lithium secondary cell was placed in a constant temperature bath having an ambient temperature of 60° C. The cell was subjected to CC charge with a charge current of 1984 mA up to 4.1 V, followed by the CC charge with a discharge current of 1984 mA down to 3.0 V. This cycle was repeated 500 times, and the discharge capacity ratio for the first cycle was compared with that for the 500th cycle.

(Internal Resistance)

First, the cell was subjected to the CC-CV charge at a charge current of 1000 mA up to 3.750 V for 1.5 hours. After that, the cell was discharged at 300 mA for 10 seconds, charged at 300 mA for 10 seconds, discharged at 900 mA for 10 seconds, charged at 900 mA for 10 seconds, discharged at 2700 mA for 10 seconds, charged at 2700 mA for 10 seconds, discharged at 540 mA for 10 seconds, charged at 5400 mA for 10 seconds, discharged at 8100 mA for 10 seconds, and charged at 8100 mA for 10 seconds. After each discharge, the internal resistance value was determined from the inclination of the approximate primary line of the current-voltage curve plotted with values in a graph with the ordinate representing the voltage after charge and discharge and the abscissa representing the charge-discharge current.

(Resistance Increase Rate)

The internal resistance increase rate was determined by repeating 500 cycles of charge-discharge operation for determining the high-temperature cycle characteristic as described above, after which the internal resistance was measured and the amount of increase of the internal resistance before and after charge-discharge operation was divided by the internal resistance before charge-discharge operation.

More specifically, the resistance increase rate (%) is given as {(internal resistance after high-temperature cycle test)−(initial internal resistance)}/(initial internal resistance).

TABLE 3

| Sample | Positive electrode active material | Initial discharge capacity (mAh/g) | Discharge capacity ratio (%) | Specific surface area (m²/g) | XRD ratio | Binder | Initial resistance (mΩ) | Resistance after charge-discharge (mΩ) | Resistance increase rate (%) |
|---|---|---|---|---|---|---|---|---|---|
| Embodiment 1 | $LiNi_{0.81}Co_{0.15}Al_{0.04}O_2$ | 158 | 82.0 | 0.65 | 0.421 | CMC/PTFE | 65.2 | 66.3 | +1.7 |
| Reference 1 | $LiNi_{0.81}Co_{0.15}Al_{0.04}O_2$ | 158 | 75.0 | 0.65 | 0.421 | PVDF | 59.8 | 74.2 | +24.0 |
| Embodiment 2 | $LiNi_{0.81}Co_{0.15}Al_{0.04}O_2$ | 160 | 82.3 | 0.55 | 0.421 | CMC/PTFE | 63.5 | 62.8 | −1.1 |
| Reference 2 | $LiNi_{0.81}Co_{0.15}Al_{0.04}O_2$ | 148 | 81.8 | 0.83 | 0.421 | CMC/PTFE | 82.1 | 82.5 | +0.5 |
| Reference 3 | $LiNi_{0.81}Co_{0.15}Al_{0.04}O_2$ | 138 | 81.6 | 1.04 | 0.421 | CMC/PTFE | 121.6 | 116.0 | −4.7 |
| Reference 4 | $LiNi_{0.81}Co_{0.15}Al_{0.04}O_2$ | 160 | 74.7 | 1.04 | 0.421 | PVDF | 59.9 | 105.0 | +75.3 |
| Embodiment 3 | $LiNi_{0.81}Co_{0.15}Al_{0.04}O_2$ | 158 | 85.0 | 0.65 | 0.412 | CMC/PTFE | 64.0 | 64.4 | +0.6 |
| Reference 5 | $LiNi_{0.81}Co_{0.15}Al_{0.04}O_2$ | 158 | 65.2 | 0.65 | 0.449 | CMC/PTFE | 70.0 | 69.8 | −0.3 |
| Reference 6 | $LiNi_{0.81}Co_{0.15}Al_{0.04}O_2$ | 160 | 72.0 | 0.65 | 0.449 | PVDF | 60.0 | 107.5 | +79.2 |
| Embodiment 4 | $LiNi_{0.81}Co_{0.15}Al_{0.04}O_2$ | 160 | 85.1 | 0.55 | 0.412 | CMC/PTFE | 65.3 | 66.5 | +1.8 |
| Embodiment 5 | $LiNi_{0.81}Co_{0.15}Al_{0.04}O_2$ | 158 | 81.1 | 0.65 | 0.421 | HEC/PTFE | 62.5 | 67.6 | +8.2 |
| Embodiment 6 | $LiNi_{0.81}Co_{0.15}Al_{0.04}O_2$ | 158 | 80.7 | 0.65 | 0.421 | HPMC/PTFE | 64.2 | 69.3 | +7.9 |
| Embodiment 7 | $LiNi_{0.81}Co_{0.15}Al_{0.04}O_2$ | 158 | 80.6 | 0.65 | 0.421 | HEMC/PTFE | 65.8 | 67.5 | +2.6 |
| Embodiment 8 | $LiNi_{0.81}Co_{0.15}Al_{0.04}O_2$ | 158 | 81.5 | 0.65 | 0.421 | CMC/FEP | 65.5 | 66.0 | +0.8 |
| Embodiment 9 | $LiNi_{0.81}Co_{0.15}Al_{0.04}O_2$ | 158 | 81.7 | 0.65 | 0.421 | CMC/PFA | 65.4 | 66.8 | +2.1 |
| Embodiment 10 | $LiNi_{0.81}Co_{0.15}Al_{0.04}O_2$ | 158 | 80.2 | 0.65 | 0.421 | CMC/Acryl | 64.4 | 65.4 | +1.6 |
| Embodiment 11 | $LiNi_{0.80}Co_{0.15}Al_{0.05}O_2$ | 160 | 82.2 | 0.65 | 0.421 | CMC/PTFE | 64.9 | 65.1 | +0.3 |

TABLE 3-continued

| Sample | Positive electrode active material | Initial discharge capacity (mAh/g) | Discharge capacity ratio (%) | Specific surface area (m²/g) | XRD ratio | Binder | Initial resistance (mΩ) | Resistance after charge-discharge (mΩ) | Resistance increase rate (%) |
|---|---|---|---|---|---|---|---|---|---|
| Embodiment 12 | LiNi$_{0.90}$Co$_{0.06}$Al$_{0.04}$O$_2$ | 168 | 81.0 | 0.65 | 0.421 | CMC/PTFE | 64.8 | 66.0 | +1.9 |
| Embodiment 13 | LiNi$_{0.75}$Co$_{0.21}$Al$_{0.04}$O$_2$ | 150 | 81.0 | 0.65 | 0.421 | CMC/PTFE | 65.1 | 66.4 | +2.0 |
| Embodiment 14 | 60/87LiNi$_{0.81}$Co$_{0.15}$Al$_{0.04}$O$_2$ + 27/87Li$_{1.12}$Mn$_{1.88}$O$_4$ | 139 | 72.4 | 0.65 | 0.421 | CMC/PTFE | 66.2 | 66.9 | +1.4 |
| Embodiment 15 | 27/87LiNi$_{0.81}$Co$_{0.15}$Al$_{0.04}$O$_2$ + 60/87Li$_{1.12}$Mn$_{1.88}$O$_4$ | 115 | 59.6 | 0.65 | 0.421 | CMC/PTFE | 66.8 | 67.0 | +0.3 |
| Reference 7 | 60/87LiNi$_{0.81}$Co$_{0.15}$Al$_{0.04}$O$_2$ + 27/87Li$_{1.12}$Mn$_{1.88}$O$_4$ | 139 | 68.6 | 0.65 | 0.421 | PVDF | 60.2 | 84.2 | +39.9 |
| Reference 8 | 27/87LiNi$_{0.81}$Co$_{0.15}$Al$_{0.04}$O$_2$ + 60/87Li$_{1.12}$Mn$_{1.88}$O$_4$ | 115 | 53.4 | 0.65 | 0.421 | PVDF | 61.0 | 93.9 | +53.9 |

Table 3 shows that according to the first embodiment, the initial discharge capacity is as high as 158 mAh/g and the discharge capacity ratio is also as high as 82.0%, indicating that the capacity degeneration of the cell is small. Also, the internal resistance is not substantially increased as indicated by the figure. 1.7% of the resistance increase rate.

In the first reference, on the other hand, the initial discharge capacity is sufficiently high, but the discharge capacity ratio is reduced to 75.0%. Specifically, the use of PVDF as a binder reduces the binding force of the positive electrode active material due to the swelling and dissolution with the electrolytic solution for a reduced discharge capacity ratio. Also, the binder does not uniformly cover the surface of the positive electrode active material or the binder develops gaps due to the swelling caused by the electrolytic solution at the time of charge or discharge. As a result, the decomposing reaction of the electrolytic solution is promoted, and the insulating film of lithium fluoride or the like grows, resulting in an increase in the resistance increase rate of 24% after the high-temperature cycle test.

In the second embodiment referring to a cell with a smaller specific surface area of the positive electrode activation material, the initial discharge capacity exhibits a high 160 mAh/g and so does the discharge capacity ratio at 82.3%. On the other hand, the resistance increase rate remains substantially unchanged at −1.1%.

In the third reference, the nitrogen BET specific surface ration is increased, so that the initial discharge capacity is reduced to 138 mAh/g. The resistance increase rate, on the other hand, is −4.7% indicating that the internal resistance remains substantially unchanged.

In the fourth reference, PVDF is used as a binder, and therefore the initial capacity is not reduced in spite of a larger nitrogen specific surface area. In view of the fact that the binder is PVDF, however, the discharge capacity ratio is considerably reduced to 74.7%. Specifically, the binder PVDF is swollen and dissolved by the electrolytic solution and reduces the binding force of the positive electrode active material for a reduced discharge capacity ratio. Also, since the binder is formed of PVDF alone, as in the first reference, the resistance increase rate rose considerably to 75.3%.

According to the third embodiment, the initial discharge capacity is as high as 158 mAh/g, and the discharge capacity ratio also exhibits a considerably high value of 85.0%. In other words, according to the third embodiment in which the crystallinity of the positive electrode active material is improved, the reduction in the charge-discharge cycle characteristic is suppressed. The resistance increase rate also substantially remains unchanged at 0.6%.

In the fifth reference, the initial discharge capacity exhibits a value as high as 158 mAh/g, but the discharge capacity ratio after the cycle test is reduced to 65.2%. In other words, since the crystallinity of the positive electrode active material is low, the cycle characteristic is reduced. The resistance increase rate also remains substantially unchanged at −0.5%.

In the sixth reference, the use of PVDF as a binder for the positive electrode leads to the initial discharge capacity of as high as 160 mAh/g, while the discharge capacity ratio after the cycle test is reduced to as low as 72.0%. Also, since the binder is formed of PVDF alone, like in the first reference, the resistance increase rate is considerably increased to 79.2%.

In the fourth embodiment, the initial discharge capacity is 158 mAh/g, the discharge capacity ratio is 81.1%, both of which are considerably high values in view of the fact that the specific surface area of the positive electrode active material is reduced while the crystallinity thereof is increased. Also, the resistance increase rate remains substantially unchanged at 1.8%.

In the fifth embodiment, the initial discharge capacity is 158 mAh/g and the discharge capacity ratio is 81.1%. Both values are high. Also, in spite of the use of HEC as a binder of the positive electrode, the resistance increase rate is suppressed to a sufficiently low value of 8.2%.

In the sixth embodiment, the initial discharge capacity is 158 mAh/g and the discharge capacity ratio of 80.7%. Both values are high. Also, in spite of the use of HPMC as a binder of the positive electrode, the resistance increase rate is suppressed to a sufficiently low value of 7.9%.

In the seventh embodiment, the initial discharge capacity is 158 mAh/g and the discharge capacity ratio of 80.6%. Both values are high. Also, in spite of the use of HEMC as a binder of the positive electrode, the resistance increase rate is suppressed to a sufficiently low value of 2.6%.

In the eighth embodiment using a FEP binder, the initial discharge capacity is 158 mAh/g and the discharge capacity ratio of 81.5%, both being high values. Also, the resistance increase rate remains substantially unchanged at +0.8%.

In the ninth embodiment using a PFA binder, the initial discharge capacity is 158 mAh/g and the discharge capacity ratio of 81.7%, both being high values. Also, the resistance increase rate remains substantially unchanged at +2.1%.

In the tenth embodiment, the initial discharge capacity is 158 mAh/g and the discharge capacity ratio of 80.2%, both being high values. Also, in spite of the use of acrylic resin as a binder of the positive electrode, the resistance increase rate remains substantially unchanged at 1.6%.

In the 11th to 13th embodiments referring to cells having different compositions of the positive electrode active material, both the initial discharge capacity and the discharge capacity ratio assume a high value. Also, the resistance increase rate is suppressed to a value as low as not more than +2.0%.

The 14th and 15th embodiments refer to cells in which a mixture of lithium nickel oxide and lithium manganese oxide is used as a positive electrode active material, and PTFE/CMC is used as a binder of the positive electrode. In the 14th embodiment in which manganese oxide is mixed at the ratio of 27/87, the initial capacity and the discharge capacity ratio assume a sufficiently high value as compared with the seventh reference in which the binder of the positive electrode is PVDF. In the 15th embodiment in which manganese oxide is mixed at the ratio of 60/87, on the other hand, the initial capacity and the discharge capacity ratio assume a sufficiently high value as compared with the eighth reference in which the binder of the positive electrode is PVDF.

These embodiments and the references show that the use of a water-soluble polymer as a binder of the positive electrode and the use of a positive electrode active material composed of lithium nickel oxide having a small specific surface area and a high crystallinity can produce a lithium secondary cell having a superior initial discharge capacity, a superior cycle characteristic and a superior resistance increase rate.

With the lithium secondary cell according to this invention, the specific surface area of the positive electrode active material and the area involved in the reaction are reduced, thereby suppressing the reduction in the cell capacity due to the reaction with water. Also, the binder has a water-soluble polymer having a superior resistance to organic solvents, which polymer covers the surface of the positive electrode activation material uniformly. Therefore, the increase of the internal resistance and the decrease of the discharge capacity are suppressed, thereby providing a cell having a superior charge-discharge cycle.

What is claimed is:

1. A lithium secondary cell comprising:
   a positive electrode including a positive electrode active material containing a $LiNiO_2$ compound expressed as $Li_xNi_{1-y}M_yO_2$ (M is at least one element selected from a group including Co, Mn, Al, B, Ti, Mg and Fe, $0<x\leq1.2$, $0<y\leq0.25$) and a binder for binding said positive electrode active material; and
   an electrolytic solution;
   wherein the BET specific surface area of said $LiNiO_2$ compound is not more than 0.65 $m^2/g$, said binder has a water-soluble polymer not swollen with said electrolytic solution, and the surface of said positive electrode active material is covered by said water-soluble polymer;
   wherein said $LiNiO_2$ compound has a peak intensity ratio $(I_{006}+I_{102})/I_{101}$ of the (006) plane, the (102) plane and (101) plane in the measurement of the X-ray powder analysis is not more than 0.421.

2. A lithium secondary cell according to claim 1, wherein said water-soluble polymer is a water-soluble cellulose.

3. A lithium secondary cell according to claim 1, wherein said binder contains a resin contributing to the flexibility of said positive electrode.

4. A lithium secondary cell according to claim 3, wherein said resin contributing to the flexibility of said positive electrode is a fluoric resin.

5. A lithium secondary cell according to claim 4, wherein said fluoric resin is polytetrafluoroethylene.

6. A lithium secondary cell according to claim 1, wherein said positive electrode active material contains a $LiMn_2O_4$ compound expressed as $Li_aMn_bMe_cO_4$ (Me is at least one element selected from the group including Co, Cu, Fe, Ni, Zn, Al, Cr, Ti, Mg and V, $1\leq a\leq1.15$, $0\leq c\leq0.35$, a+b+c=3).

7. A method of fabricating the positive electrode of a lithium secondary cell, comprising the steps of:
   preparing a paste-like activation material mixture of a positive electrode active material having a $LiNiO_2$ compound expressed as $Li_xNi_{1-y}M_yO_2$ (M is at least one element selected from a group including Co, Mn, Al, B, Ti, Mg and Fe, $0<x\leq1.2$, $0<y\leq0.25$), said $LiNiO_2$ compound having the BET specific surface area of not more than 0.65 $m^2/g$, a binder containing a water-soluble polymer not swollen with the electrolytic solution used for the lithium secondary cell, and water; and
   coating said paste-like active material mixture on a collector;
   wherein said $LiNiO_2$ compound is such that the peak intensity ratio $(I_{006}+I_{102})/I_{101}$ of the (006) plane, the (102) plane and the (101) plane in the measurement of the X-ray powder analysis is not more than 0.421.

8. A method of fabricating the positive electrode of a lithium secondary cell according to claim 7, wherein said water-soluble polymer is a water-soluble cellulose.

9. A method of fabricating the positive electrode of a lithium secondary cell according to claim 7, wherein said binder contains a resin contributing to the flexibility of said positive electrode.

10. A method of fabricating the positive electrode of a lithium secondary cell according to claim 9, wherein said resin contributing to the flexibility of said positive electrode is a fluoric resin.

11. A method of fabricating the positive electrode of a lithium secondary cell according to claim 10, wherein said fluoric resin is polytetrafluoroethylene.

12. A method of fabricating the positive electrode of a lithium secondary cell according to claim 7, wherein said positive electrode activation material contains a $LiMn_2O_4$ compound expressed as $Li_aMn_bMe_cO4$ (Me is at least one element selected from a group including Co, Cu, Fe, Ni, Zn, Al, Cr, Ti, Mg and V, $1\leq a\leq1.15$, $0\leq c\leq0.35$, a+b+c=3).

* * * * *